United States Patent
Takahashi

[19]

[11] Patent Number: 5,954,129
[45] Date of Patent: Sep. 21, 1999

[54] FLOW CONTROL UNIT

[76] Inventor: Kei Takahashi, 1-14-16 Achi Kurashiki, Okayama, Japan, 710

[21] Appl. No.: 08/799,843

[22] Filed: Feb. 13, 1997

[30] Foreign Application Priority Data

| Feb. 14, 1996 | [JP] | Japan | 8-052432 |
| Feb. 19, 1996 | [JP] | Japan | 8-056982 |
| Feb. 20, 1996 | [JP] | Japan | 8-058388 |

[51] Int. Cl.⁶ .............................. G05D 15/00; F28F 3/00
[52] U.S. Cl. ......................... 165/286; 165/46; 165/166
[58] Field of Search .................................. 165/286, 166, 165/46, 45; 126/343.5 R

[56] References Cited

U.S. PATENT DOCUMENTS

| 4,258,784 | 3/1981 | Perry | 165/166 |
| 4,263,967 | 4/1981 | McNab | 165/166 |
| 4,480,635 | 11/1984 | Ostrovsky | 126/445 |
| 4,524,757 | 6/1985 | Buckley | 126/426 |
| 4,817,707 | 4/1989 | Aoyama | 165/46 |
| 5,033,537 | 7/1991 | Atkin | 165/32 |

FOREIGN PATENT DOCUMENTS

| 63-297966 | 12/1988 | Japan . |
| 1-147257 | 6/1989 | Japan . |
| 2-55056 | 4/1990 | Japan . |
| 2-100168 | 8/1990 | Japan . |
| 2-106551 | 8/1990 | Japan . |
| 4-14967 | 2/1992 | Japan . |
| 4-53157 | 5/1992 | Japan . |
| 4-57161 | 5/1992 | Japan . |
| 4-63745 | 5/1992 | Japan . |
| 4-165266 | 6/1992 | Japan . |
| 4-306459 | 10/1992 | Japan . |
| 5-10952 | 2/1993 | Japan . |
| 5-26517 | 2/1993 | Japan . |
| 5-94656 | 12/1993 | Japan . |
| 5-94657 | 12/1993 | Japan . |
| 6-185811 | 7/1994 | Japan . |
| 6-51751 | 7/1994 | Japan . |
| 6-56657 | 8/1994 | Japan . |
| 6-59762 | 8/1994 | Japan . |
| 6-64066 | 9/1994 | Japan . |
| 6-64067 | 9/1994 | Japan . |
| 6-339259 | 12/1994 | Japan . |
| 7-8996 | 3/1995 | Japan . |
| 7-35956 | 7/1995 | Japan . |
| 7-41267 | 7/1995 | Japan . |
| 7-41283 | 7/1995 | Japan . |
| 7-42915 | 8/1995 | Japan . |
| 7-42918 | 8/1995 | Japan . |
| 7-48040 | 11/1995 | Japan . |
| 8-61784 | 3/1996 | Japan . |
| 8-184216 | 7/1996 | Japan . |
| 8-261569 | 10/1996 | Japan . |

*Primary Examiner*—Ira S. Lazarus
*Assistant Examiner*—Lance Chandler
*Attorney, Agent, or Firm*—Carrier, Blackman & Associates, P.C.; Joseph P. Carrier; William D. Blackman

[57] ABSTRACT

A flow control panel includes a pair of upper and lower sheets arranged one above the other. The upper sheet has a plurality of integral ridges and a plurality of recesses between adjacent ridges. Likewise, the lower sheet has a plurality of integral ridges and a plurality of recesses between adjacent ridges. The upper and lower sheets are superimposed so that each of the upper ridges is positioned in respective one of the lower recesses between adjacent lower ridges to form a plurality of passages through which a flowing fluid medium flows. When a pressure increase occurs within the passages, the upper and lower sheets are relatively moved away from one another to increase the cross sectional area of the passages to accommodate such a pressure increase within the passages.

14 Claims, 13 Drawing Sheets

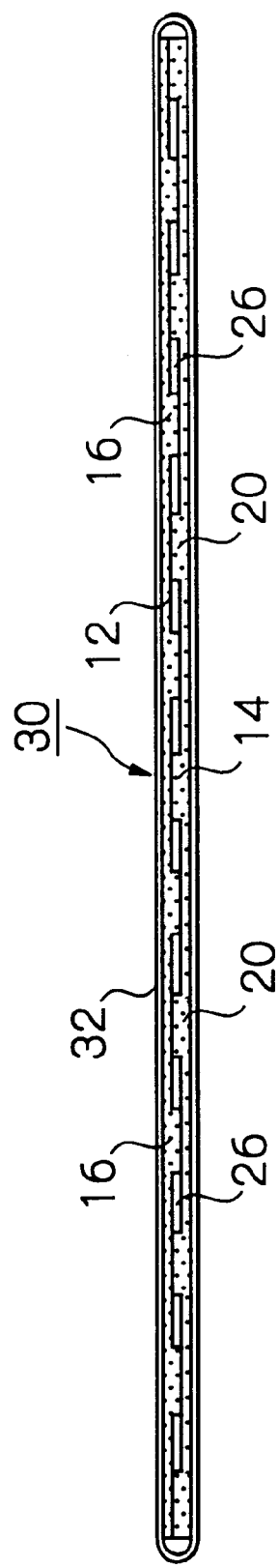
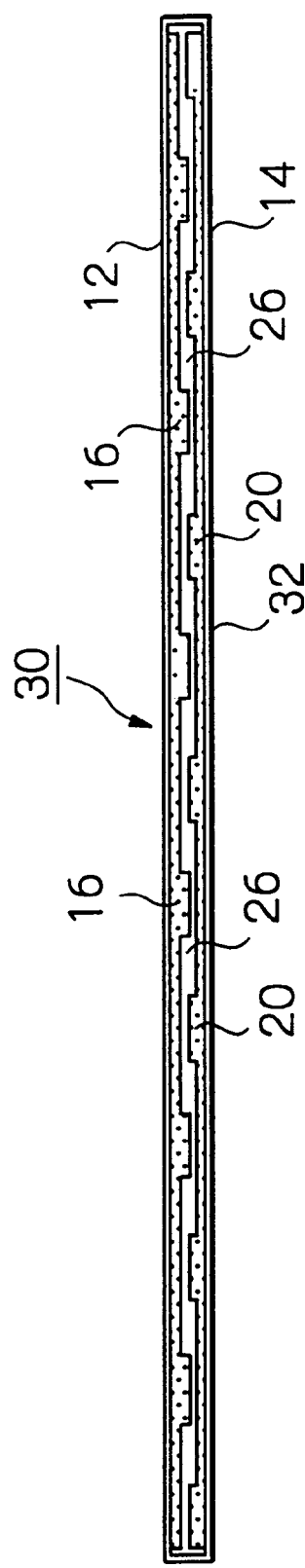

FLOW CONTROL UNIT

BACKGROUND OF THE INVENTION

1. Field of the Invention

The present invention relates to flow control units adapted to permit the flow of a fluid in a controlled manner. More particularly, this invention is directed to a flow control panel which directs a flowing fluid medium through a plurality of passages and which is capable of adjusting the flow rate of the flowing fluid medium. Such a flow control panel may be used as a heat exchanger, an evaporator or similar apparatus.

2. Description of the Related Art

Various attempts have been made to cause a fluid to flow over a flat sheet or through a panel. For example, Japanese laid-open utility model publication No. 7-41267 discloses a flat tubing which includes a guide made of a fibrous material and adapted to allow a flowing fluid medium to flow therethrough, and pressure control passages defined at opposite sides of the guide passage. However, a disadvantage with the tubing is that the air tends to remain in the guide. This results in uneven flow of the fluid.

Japanese laid-open patent publication No. 8-61784 discloses a flow control panel (see FIG. 19) which generally includes a flat substrate, an intermediate, hydrophilic layer attached to the substrate, and a plurality of partitions attached to the intermediate layer and arranged in parallel. By this arrangement, a plurality of fluid passages are defined on the intermediate layer between adjacent partitions. The partitions, typically made of resin, are attached to the intermediate layer by application of pressure and heat. However, the resin is likely to enter the fluid passages while the pressure is being applied to the partitions. This results in a decrease in the cross sectional area of the passages and thus, impedes or limits the flow of a fluid through the passages.

Japanese utility model publication No. 7-8996 discloses an improved flow control panel (see FIGS. 20 and 21) designed to allow a relatively large amount of fluid to flow through passages in a controlled manner. To that end, a cover sheet is secured to the free ends of partitions and expandable so as to prevent the internal pressure of the passages from increasing. However, after repeated use, the cover sheet often becomes elongated as a result of thermal expansion. Such elongation also occurs where a vacuum is created in the bottom of the passages as a result of a reduced flow rate. Slackening of the cover sheet results, as seen in FIG. 21. Another problem is that the cover sheet tends to be attached to the substrate under the influence of a fluid remaining in the passages. Consequently, the passages partly closes. In the case that the panel is used as a heat exchanger, slackening of the cover sheet and closing of the passages deteriorate the heat exchange or heat transfer capability of the panel. The panel is also susceptible to vertical loads which can also cause changes in the cross sectional area of the passages. Such changes prevent the flow rate of a fluid from being adequately controlled.

Accordingly, it is an object of the present invention to provide a flow control unit wherein the effective cross sectional area of passages can be varied in response to a change in the flow rate of a fluid flowing through the passages to thereby accommodate changes in the internal pressure of the passages.

It is another object of the present invention to provide a flow control unit which includes permeable partitions or pressure relief means to provide a fluid communication between adjacent passages.

It is a further object of the present invention to provide a flow control unit which is durable, economical and easy to manufacture.

SUMMARY OF THE INVENTION

According to one aspect of the present invention, there is provided a flow control unit for enabling control of the flow of a flowing fluid medium which comprises at least one pair of first and second sheets, the first sheet including a plurality of parallel first ridges extending along the length of the first sheet, and a plurality of first recesses defined in the first sheet between adjacent first ridges, and the second sheet including a plurality of parallel second ridges extending along the length of the second sheet, and a plurality of second recesses defined in the second sheet between adjacent second ridges. The first and second sheets are superimposed so that each of the first ridges is positioned in a respective one of the second recesses between adjacent second ridges so as to form a plurality of passages through which the flowing fluid medium flows. The first and second sheets are movable relative to one another so that the first and second ridges are moved away from the second and first sheets, respectively to increase the cross sectional area of the passages when a pressure increase occurs therewithin.

The first and second sheets may be enclosed by a substantially flat tube made of resin. The first and second sheets preferably have a sufficient tensile strength. In one embodiment, the first and second sheets are made of a relatively high density unwoven fabric, and the first and second ridges are made of a relatively low density unwoven fabric.

According to another aspect of the present invention, there is provided a flow control unit for enabling control of the flow of a flowing fluid medium which comprises a first sheet, a plurality of parallel first partitions attached to the first sheet and extending along its length, a plurality of first recesses defined in the first sheet between adjacent first partitions, a second sheet, a plurality of parallel second partitions attached to the second sheet and extending along its length, a plurality of second recesses defined in the second sheet between adjacent second ridges, and a substantially flat flexible tube adapted to surround the first and second sheets. The first and second sheets are superimposed so that each of the first partitions is positioned in a respective one of the second recesses between adjacent second partitions so as to form a plurality of passages through which the flowing fluid medium flows. The first and second partitions are permeable and secured to the first and second sheets.

BRIEF DESCRIPTION OF THE DRAWINGS

The present invention will now be described by way of example with reference to the accompanying drawings, in which:

FIG. 4 is a sectional view of a flow control unit made according to a second embodiment of the present invention;

FIG. 5 is a view similar to that of FIG. 4, but showing the manner in which the sheets are moved away from one another within a tube;

DESCRIPTION OF THE PREFERRED EMBODIMENTS

Figure 1:
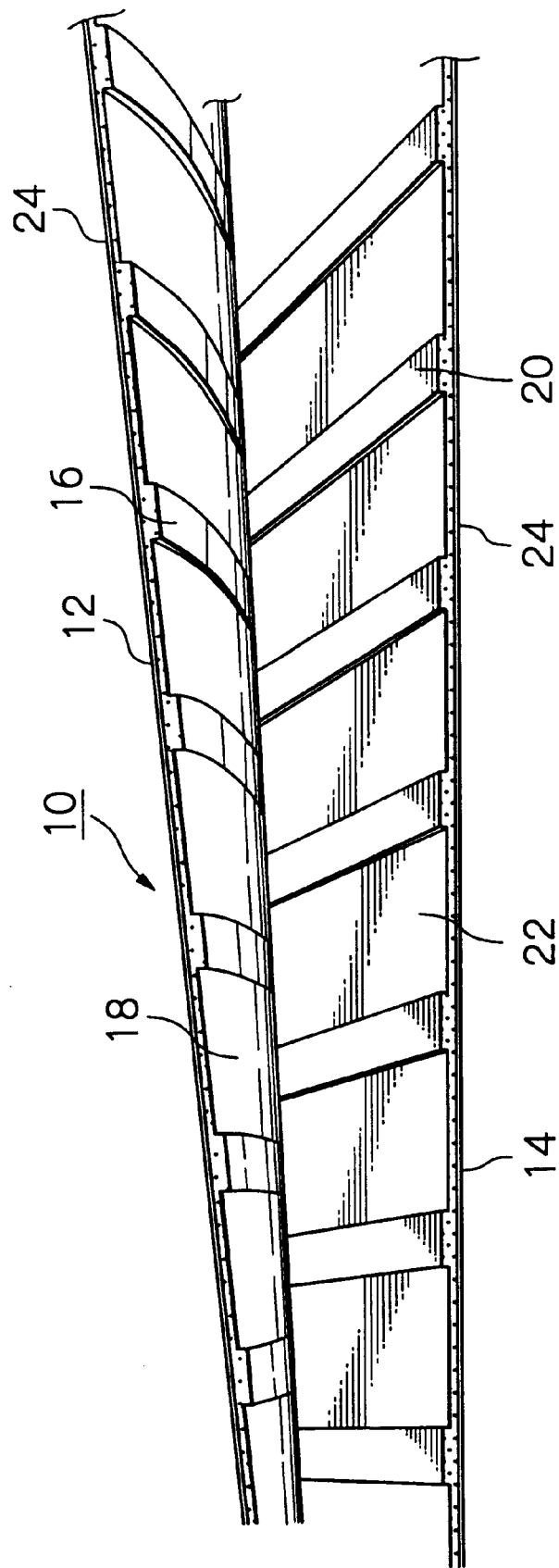
FIG. 1 is an exploded perspective view of a flow control unit made according to a first embodiment of the present invention.

Referring now to FIG. 1, there is shown a flow control unit or panel made according to a first embodiment of the present invention. Specifically, a flow control panel 10 includes a pair of upper and lower flat sheets 12 and 14. The upper sheet 12 has a plurality of elongated ridges 16 extending along the length of the upper sheet 12 and arranged substantially in parallel, and a plurality of elongated recesses 18 formed between adjacent ridges 16. Similarly, the lower sheet 14 has a plurality of elongated ridges 20 extending along the length of the lower sheet 14 and arranged substantially in parallel, and a plurality of elongated recesses 22 formed between adjacent ridges 20. In the illustrated embodiment, the sheets 12 and 14 and the ridges 16 and 20 are integrally formed together. A pair of upper and lower covers 24 are attached to the outer surface of the upper and lower sheets 12 and 14 and made of resin.

Figure 2:
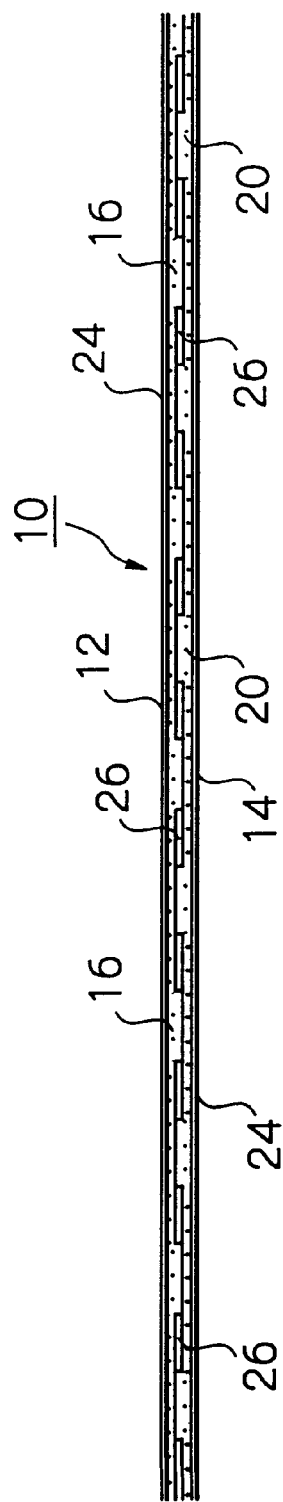
FIG. 2 is a sectional view of the flow control unit shown in FIG. 1.

As shown in FIG. 2, the upper sheet 12 is placed on the lower sheet 14 so that each of the ridges 16 is positioned between adjacent ridges 20 so as to define a plurality of fluid passages 26 through which a suitable flowing fluid medium such as water flows. Illustratively, the ridges 16 and 20 are arranged at substantially equal intervals along the width of the sheets 12 and 14 so as to allow the passages 26 to have a substantially equal cross sectional area. It is to be understood, however, that the passages 26 may have different cross sectional areas.

Figure 3:
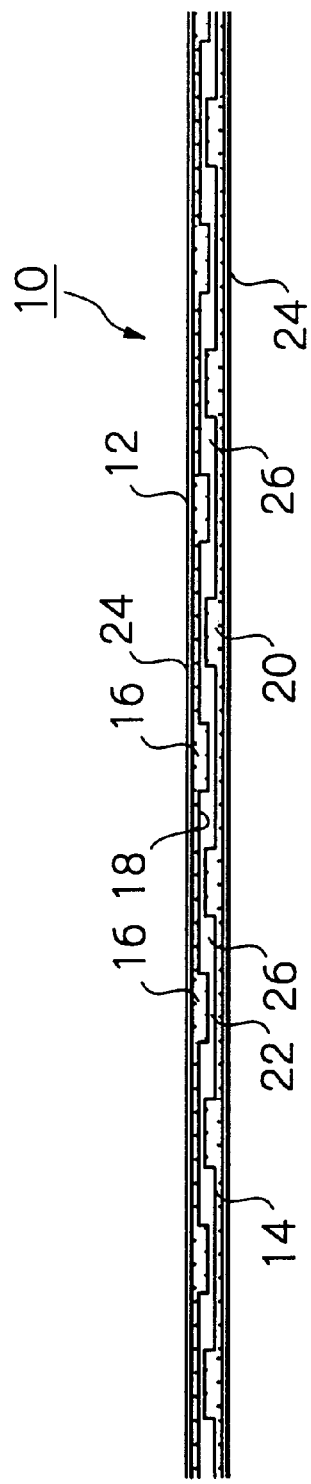
FIG. 3 is a view similar to that of FIG. 2, but showing the manner in which as a result of an increased pressure within the unit, a pair of sheets are moved away from one another.

Referring to FIG. 3, when a pressure increase occurs within the passages 26, the upper and lower sheets 12 and 14 are vertically moved away from one another to thereby increase the effective cross sectional area of the passages 26 while allowing a flowing fluid medium to flow through the passages 26 in a controlled dynamic manner. This movement is effective to accommodate such a pressure increase within the passages 26 and prevents undesirable local expansion of the sheets 12 and 14.

Some of the ridges 16 and 20 may be secured to the upper and lower sheets 12 and 14. Alternatively, all of the ridges may be secured to the upper and lower sheets 12 and 14. In such a case, the ridges 12 and 14 should be made of a permeable material.

Referring to FIG. 4, there is shown a flow control unit or panel 30 made according to a second embodiment of the present invention. Like parts are given like reference numerals used in FIG. 1. The flow control panel 30 shown in FIG. 4 is substantially identical in structure to that shown in FIG. 1 except that the upper and lower sheets 12 and 14 are enclosed by a flat tube 32. The tube 32 is preferably made of resin. As shown in FIG. 5, where a pressure increase occurs within the passages 26, the tube 32 is expanded so as to allow the upper and lower sheets 12 and 14 to be moved away from one another in a controlled, dynamic manner as in the previous embodiment. Although not specifically shown in the drawings, three or more sheets 12 and 14 may be superimposed one above the other and enclosed by the tube 32.

Figure 6:
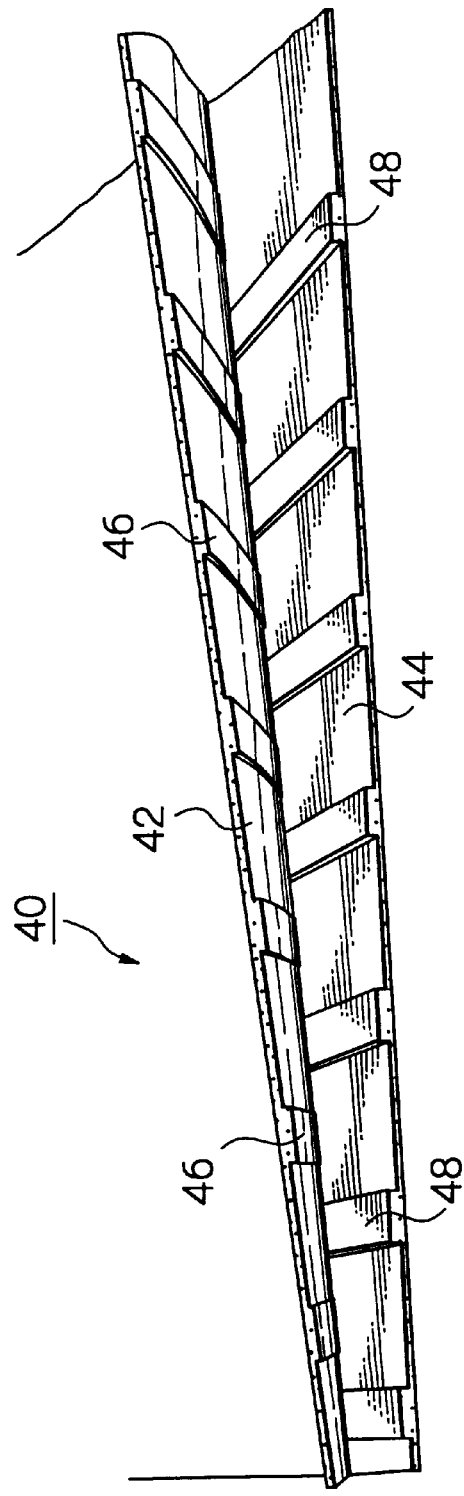
FIG. 6 is an exploded perspective view of a flow control unit made according to a third embodiment of the present invention.
Figure 7:
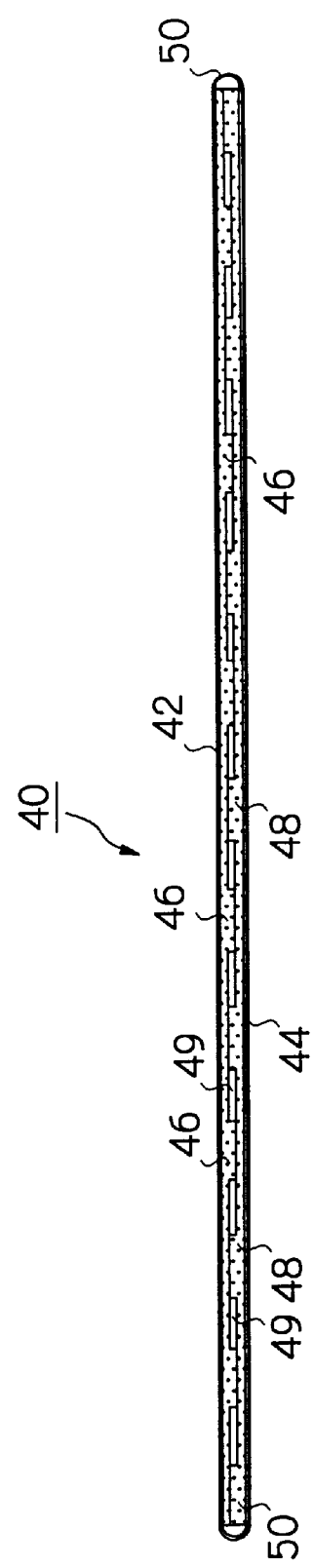
FIG. 7 is a sectional view of the flow control unit shown in FIG. 6.

Referring to FIG. 6, there is shown a flow control panel made according to a third embodiment of the present invention. Specifically, a flow control panel 40 includes a pair of upper and lower flat sheets 42 and 44. A plurality of elongated partitions 46 are secured to the upper sheet 42 and arranged in parallel. Likewise, a plurality of elongated partitions 48 are secured to the lower sheet 44 and arranged in parallel. In this embodiment, the upper and lower sheets 42 and 44 are flexible and have a sufficient tensile strength. To this end, the sheets 42 and 44 are made of a relatively high density unwoven fabric, and the partitions 46 and 48 are made of a relatively low density unwoven fabric. As shown in FIG. 7, the upper sheet 42 is placed on the lower sheet 44 so that each of the partitions 46 is positioned between adjacent partitions 48 to define a plurality of fluid passages 49. As in the embodiment shown in FIG. 4, the upper and lower sheets 42 and 44 are enclosed by a substantially flat waterproof tube 50 made of resin. The operation of the flow control panel 40 is the same as that of the flow control panel 30 and will not be described herein.

Figure 8:
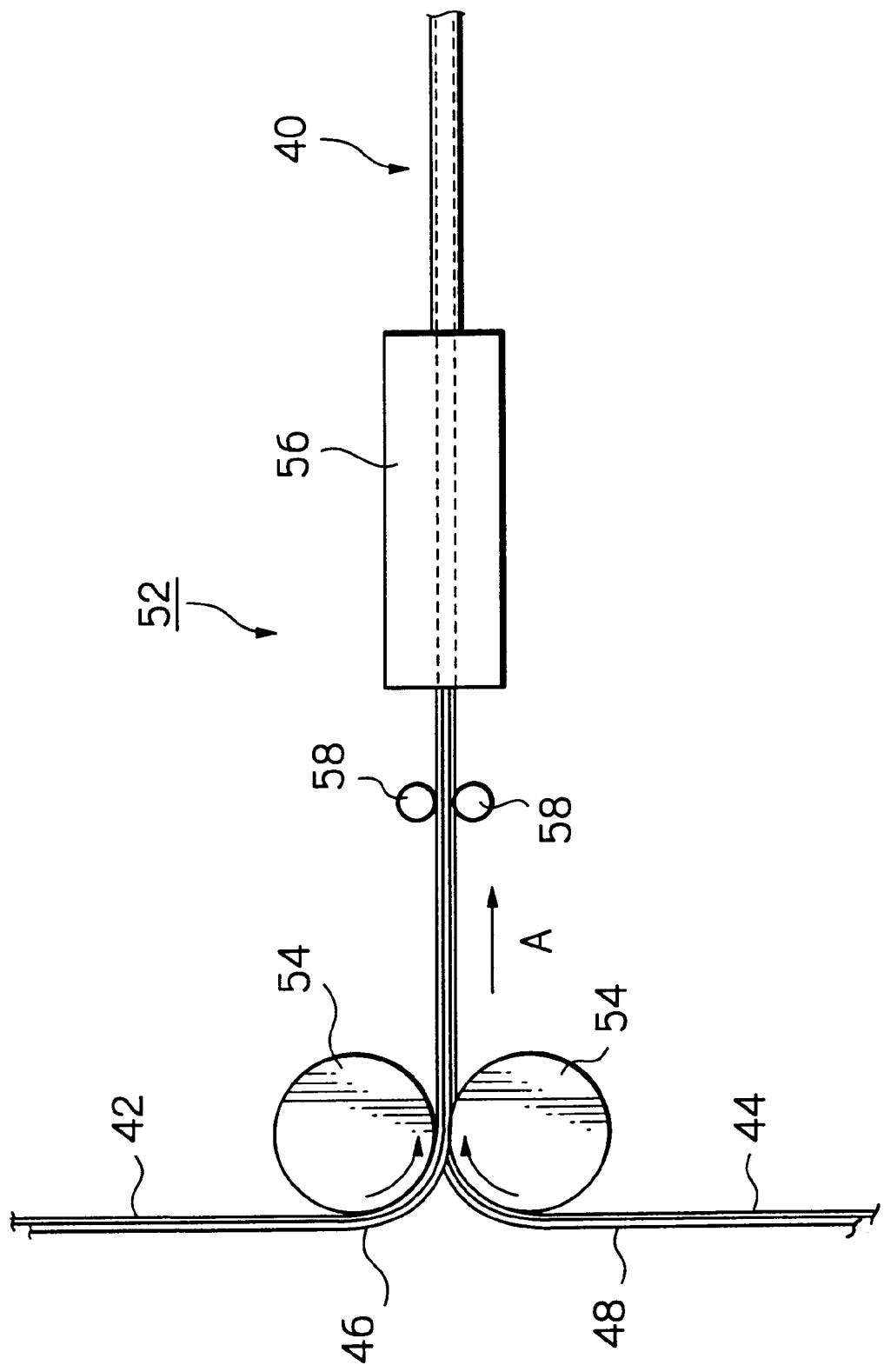
FIG. 8 is a schematic view showing a machine adapted to manufacture the flow control unit shown in FIGS. 6 and 7.

FIG. 8 schematically illustrate a suitable machine for manufacturing the flow control panel 40 shown in FIGS. 6 and 7. A machine 52 typically comprises a pair of press rollers 54, an extruder die 56 provided downstream of the press rollers 54, and a pair of feed rollers 58 arranged between the press rollers 54 and the extruder die 56. The upper and lower sheets 42 and 44 and the partitions 46 and 48 are simultaneously fed between the press rollers 54 whereby the partitions 46 and 48 are secured to the sheets 42 and 44 under pressure and heat. The upper and lower sheets 42 and 44 and the partitions 46 and 48 are then fed into the extruder die 56 in the direction of the arrow A in FIG. 8. A continuous tubing is fed through the die opening (not shown) of the extruder die 56 to enclose the upper and lower sheets 42 and 44.

Figure 9:
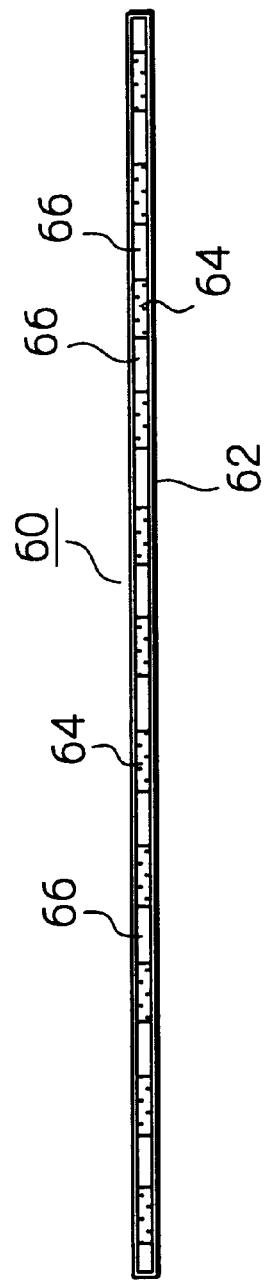
FIG. 9 is a sectional view of a flow control unit made according to a fourth embodiment of the present invention.
Figure 10:
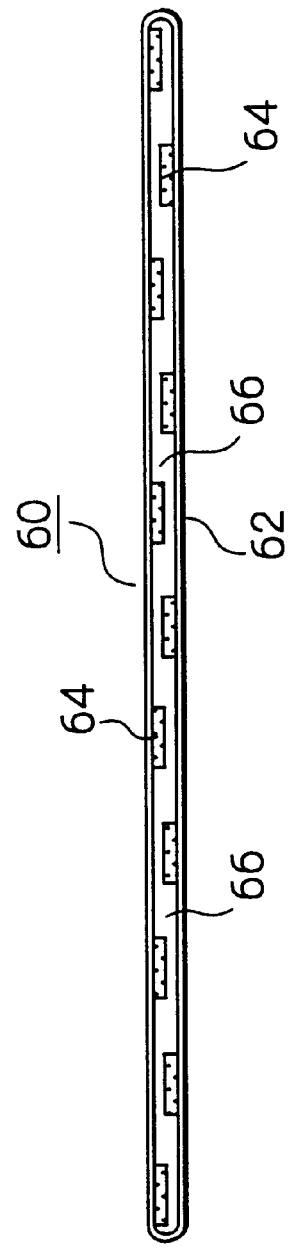
FIG. 10 is a view similar to that of FIG. 9, but showing the manner in which a tube is expanded so as to increase the effective cross sectional area of each passage.

Referring to FIG. 9, there is shown a flow control unit or tube made according to a fourth embodiment of the present invention. Specifically, a flow control tube 60 includes a flat tube 62 made of resin, and a plurality of elongated partitions 64 extending along the length of the tube 62. The partitions 64 are attached to the upper and lower faces of the tube 62 in an alternate manner to define a plurality of fluid passages 66 within the tube 62. As shown in FIG. 10, where a pressure increase occurs within the passages 66, the flexible tube 62 is expanded so as to increase the effective cross sectional area of the passages 66 to dynamically accommodate such a pressure increase within the tube 62, as in the foregoing embodiments.

Figure 11:
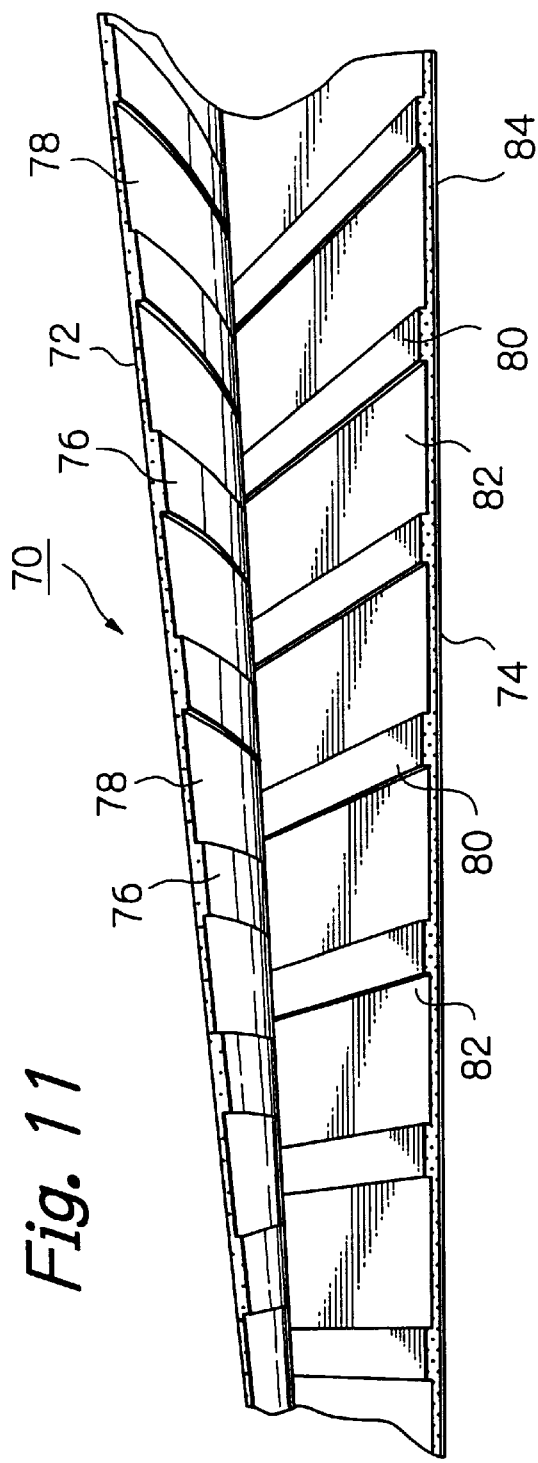
FIG. 11 is an exploded perspective view of a flow control unit made according to a fifth embodiment of the present invention.
Figure 12:
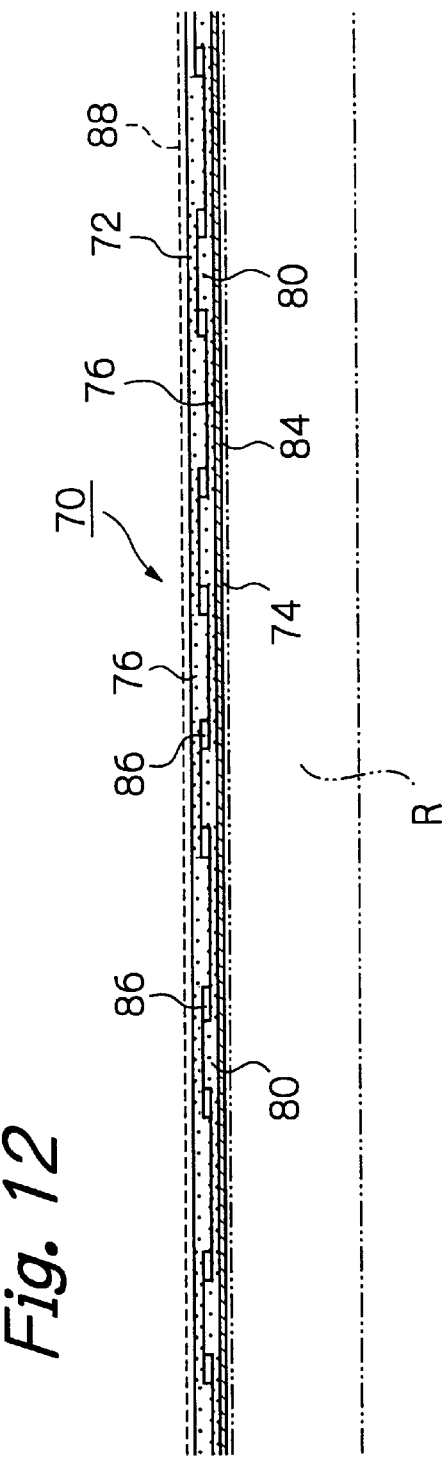
FIG. 12 is a sectional view of the flow control unit shown in FIG. 11.

Referring next to FIG. 11, there is shown a flow control unit or panel 70 according to a fifth embodiment of the present invention. As in the first embodiment, the flow control panel 70 includes an upper sheet 72 and a lower sheet 74. The upper sheet 72 has a plurality of elongated ridges 76 arranged in parallel, and a plurality of recesses 78 formed between adjacent ridges 74. Similarly, the lower sheet 74 has a plurality of elongated ridges 80 arranged in parallel, and a plurality of recesses 82 formed between adjacent ridges 80. A cover 84 is made of resin and attached to the lower surface of the lower sheet 74. The upper sheet 72 is placed on the lower sheet 74 so that each of the ridges 76 is positioned between adjacent ridges 80 to define a plurality of fluid passages 86 as shown in FIG. 12. The upper and lower ridges 76 and 80 are firmly secured to the lower and upper sheets 72 and 74 so as to hold the sheets in position.

Typically, the flow control panel 70 is placed on a snowy road R as shown in FIG. 12 so as to promote melting of snow. Preferably, the lower sheet 74 and the ridges 80 are made of a rigid material. The upper sheet 72 is made of a permeable material, and the ridges 76 provide water retention characteristics. A suitable fluid such as water is fed through the passages 86. The water is then forced to pass upwardly through the upper sheet 72 and forms a surface layer 88, as shown by broken line in FIG. 12, over the upper sheet 72. Heat exchange immediately takes place between the surface layer 88 and the snow on the road R so as to melt the snow or bring it into a sherbet form.

The flow control panel 70 may also be embedded in the ground and serve as a drain, feedwater, water retention or underwater collection means.

Figure 13:
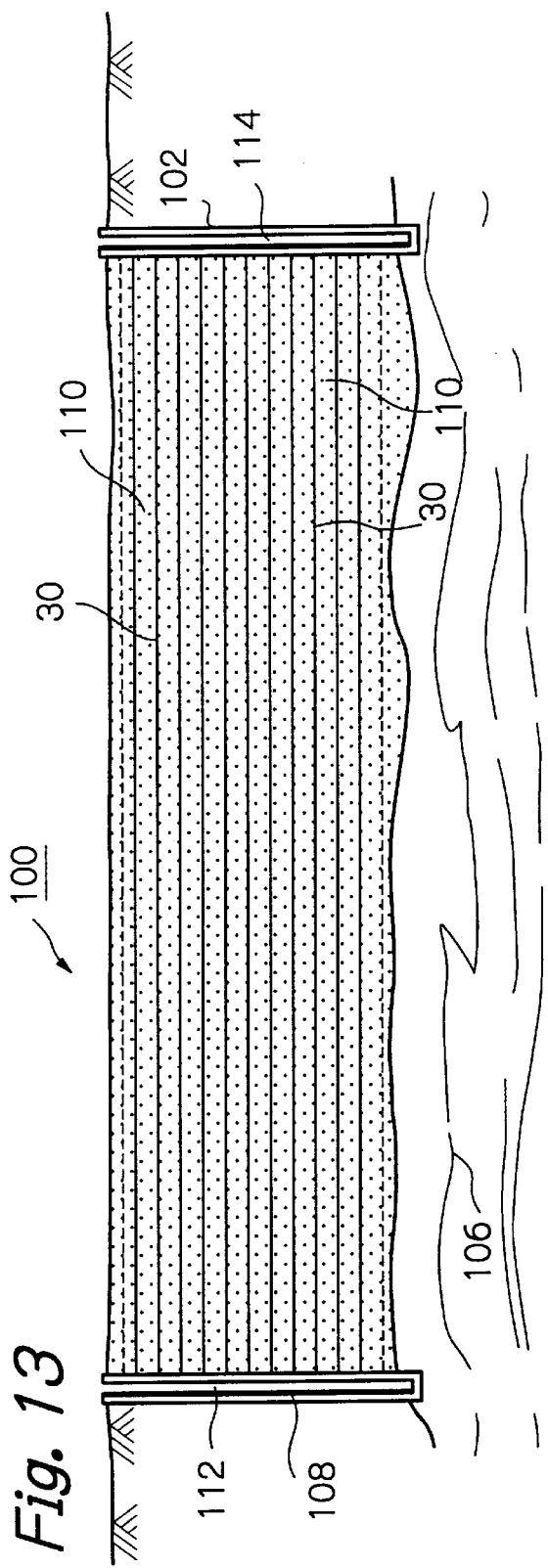
FIG. 13 is a longitudinal sectional view taken on the line XIII—XIII in FIG. 15.
Figure 14:
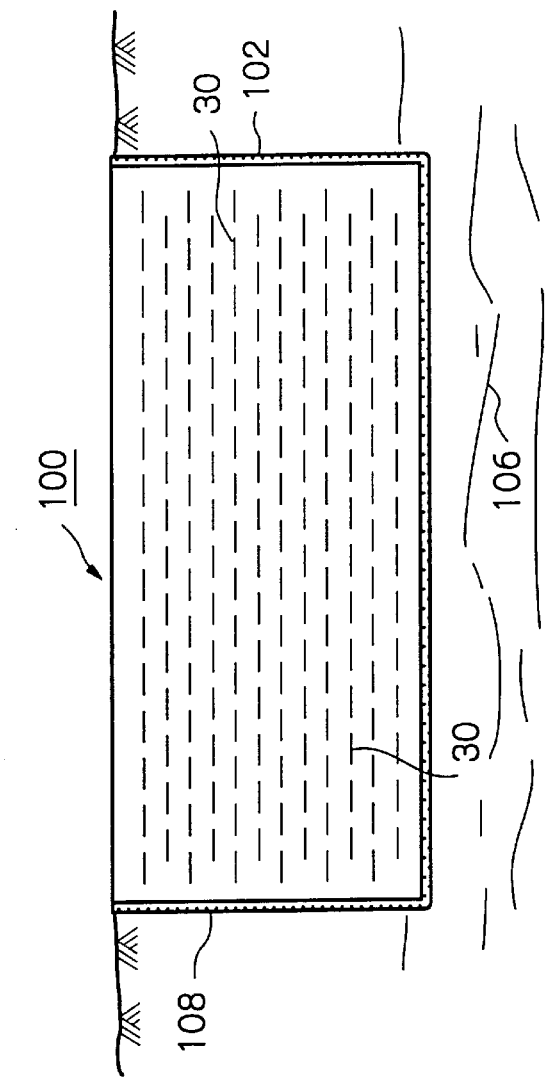
FIG. 14 is a transverse sectional view taken on the line XIV—XIV in FIG. 15.
Figure 15:
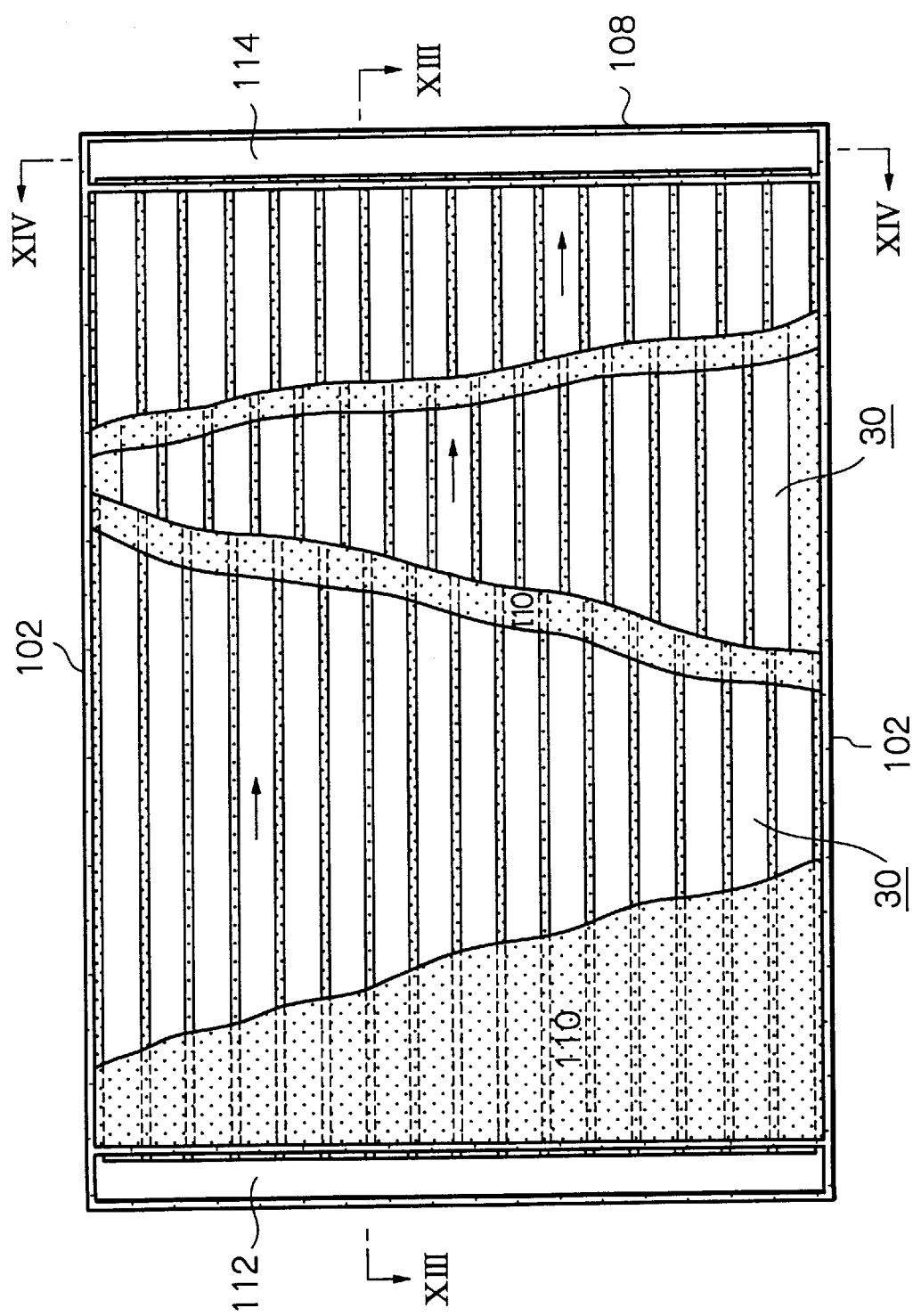
FIG. 15 is a plan view of an underground heat collector as one application of the present invention, with part broken away to show its internal structure.

Turning to FIGS. 13 to 15, there is shown an underground heat collector to which the present invention is applied. Specifically, an underground heat collector 100 includes a continuous side wall 102 made of concrete and built on an impermeable stratum 106. The soil within the side wall 102 is excavated to form a heat collector shell 108. A heat collecting element 110 is arranged in the bottom of the shell 108 by the use, for example, of a compression roller (not shown). The soil as excavated is separated into particles of various diameters by sieving. Advantageously, the heat collecting element 110 is made from the particles of given diameters. The flow control panel 30 shown in FIG. 4 is then placed on the heat collecting element 110. Subsequently, the heat collecting elements 110 and the flow control panels 30 are alternately arranged in a vertical stack. During this process, an appropriate amount of water is repeatedly introduced into the shell 108 to dampen the heat collecting elements 110.

A pair of reservoirs 112 and 114 are formed in opposite longitudinal ends of the shell 108 and communicated with each other through the flow control panels 30. Although not specifically shown in the drawing, the level of the reservoir 112 is higher than that of the reservoir 114. With this arrangement, a heat exchange medium such as water within the reservoir 112 flows toward the reservoir 114 in the direction of the arrows in FIG. 15. At this time, heat exchange takes place between the heat exchange medium and the heat collecting elements 110. It is to be understood that the weight of the heat collecting elements 110 and the pressure of the water within the shell 108 between the reservoirs 112 and 114 are applied to the heat collecting elements 110 from their outside, whereas the pressure of the heat exchange medium is applied to the heat collecting elements 110 from their inside. The level of the heat exchange medium within the reservoirs 112 and 114 and the level of the water within the shell 108 between the reservoirs 112 and 114 can be adjusted as required.

Conventionally, a water-water type heat pump was used to collect heat from a stream of relatively low temperature river water. However, such a conventional heat pump is rather expensive to manufacture and install and thus, impractical. This problem can be overcome by the use of undulating flow control panels according to a different embodiment of the present invention.

Figure 16:
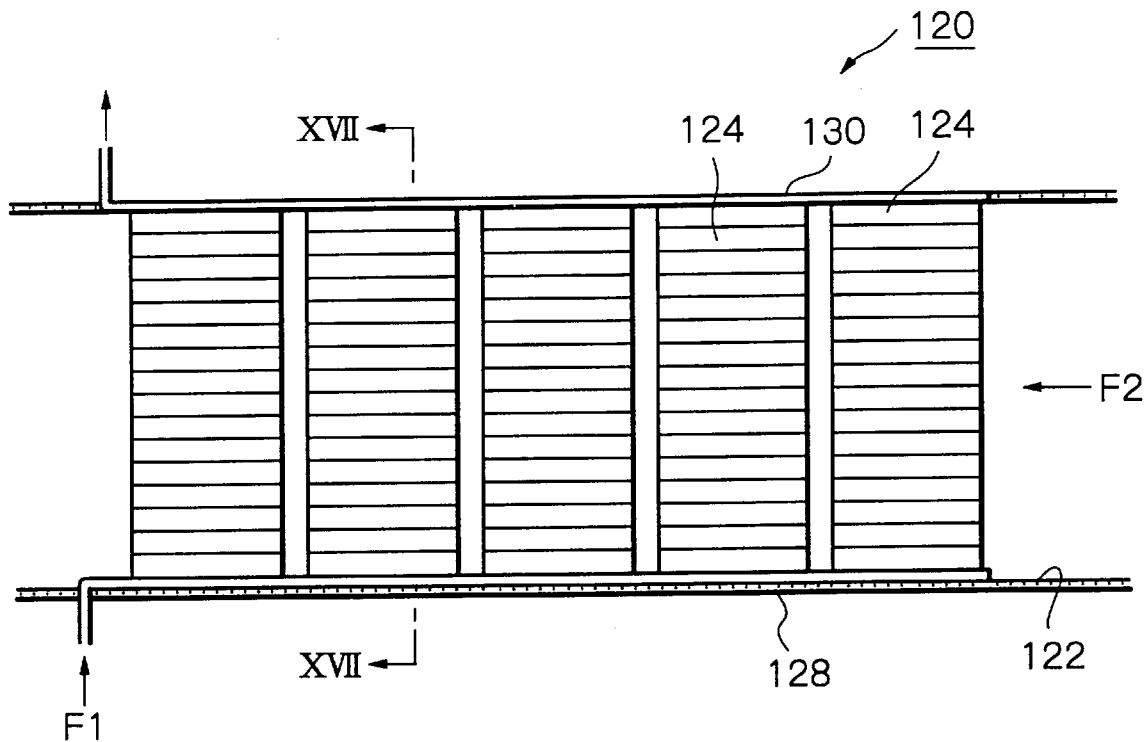
FIG. 16 is a plan view of flow control units made according to a sixth embodiment of the present invention and incorporated into a heat exchanger.
Figure 17:
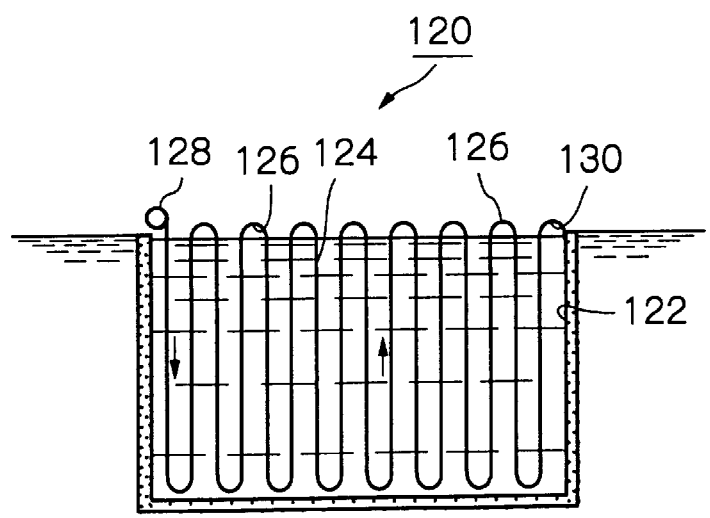
FIG. 17 is sectional view taken on the line XVII—XVII in FIG. 16.

Referring specifically to FIGS. 16 and 17, a large-sized heat exchanger 120 includes a channel 122 and a plurality of undulating flow control panels 124 arranged in parallel along the channel 122. The undulating heat exchanger panels 124 are suspended from a common support 126 and immersed in a fluid flowing through the channel 122. The undulating heat exchanger panels 124 are similar in structure to the flow control panel 30 shown in FIG. 4 except that the undulating heat exchanger panels 124 extend along an undulating path rather than a straight path as in the flow control panel 30. Thus, details of the undulating heat exchanger panels 124 will not be described herein. A supply conduit 128 is connected to the undulating heat exchanger panels 124 to introduce low temperature water from the sea into the heat exchanger panels 124, in the direction of the arrow F1 in FIG. 16, after the sea water has been filtered. Used high temperature sea water is introduced in the direction of the arrow F2 in FIG. 16 and flows along the outer surface of each of the heat exchanger panels 124 to effect heat exchange between the liquids. As a result of this heat exchange, heat is collected by a heat collector means as designated by the reference numeral 130.

In the embodiment shown in FIGS. 16 and 17, a buoyant force is applied to the underwater heat exchanger panels 124. This force reduces the loads of the underwater heat exchangers 124 applied to their support 126. As such, the underwater heat exchanger panels are easier to install than a conventional ground heat exchanger.

Figure 18:
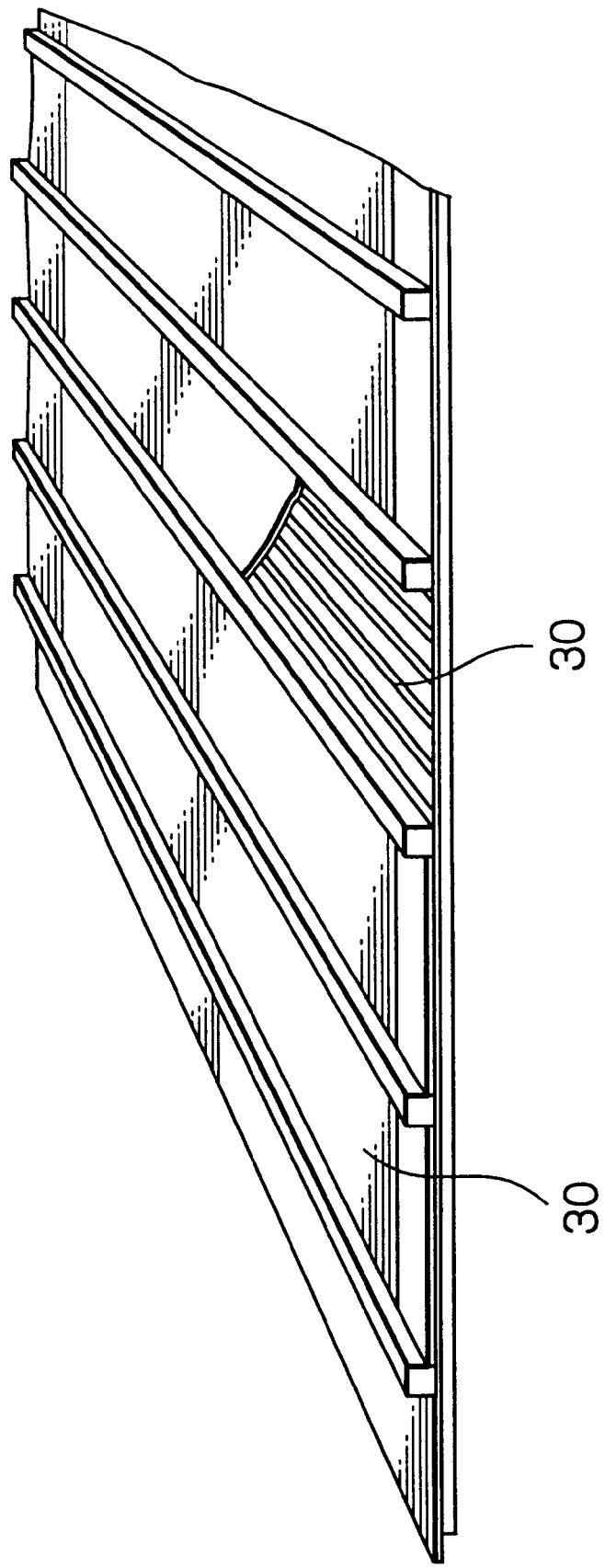
FIG. 18 is a perspective view of the flow control unit shown in FIG. 4 and arranged in the roof of a house.
Figure 19:
FIG. 19 is a sectional view of a conventional flow control unit.
Figure 20:
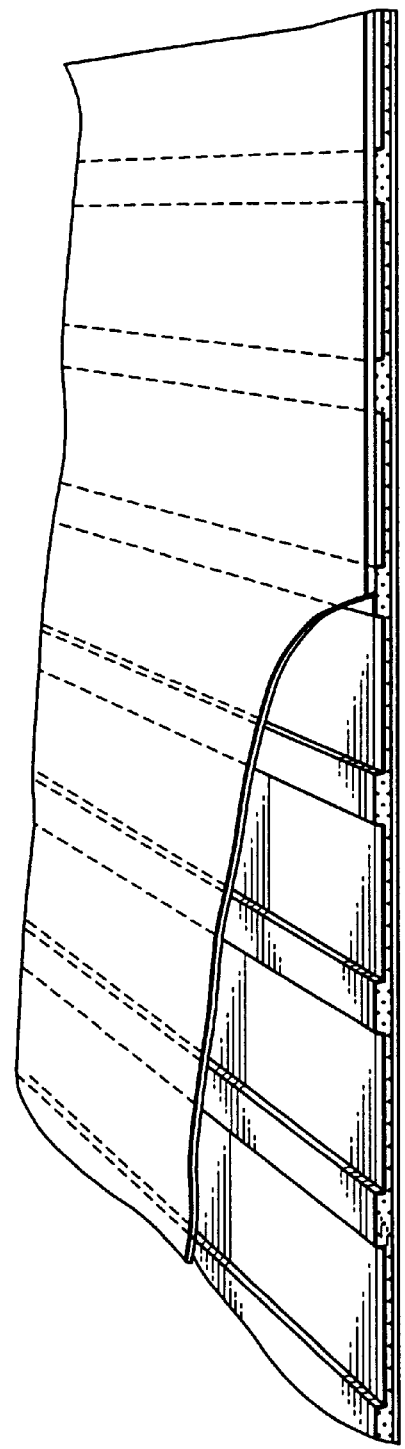
FIG. 20 is a perspective view of another flow control unit known in the art.
Figure 21:
FIG. 21 is a sectional view of the prior art control unit shown in FIG. 20.

Referring to FIG. 18, the flow control panel 30 may also be arranged in the roof of a house so as to melt snow, collect heat or dissipate heat.

The flow control panel may also be used as a heat collection panel, particularly during summer, to collect heat from the sun, or as a cooling panel to cool the roof or the outer wall of a house. When the flow control panel is mounted to the inner wall of the house, it may serve as a heat exchanger to adjust or control the temperature of air in the house. Additionally, the flow control panel by itself may be used as building or construction materials. The flow control panel may be made in the form of a heat exchanger membrane. Further, the flow control panel may be attached to a variety of boards. A plurality of combined flow control panels/boards may be interconnected together to form a unit.

Advantageously, cold water can readily be produced if water is introduced into the flow control panel when embedded horizontally in the ground. The flow control panel may, of course, be embedded in any other orientations. The flow control panel, for example, when placed on a snowy road, can effectively melt snow. Moreover, the flow control panel, when installed in the base of a house, can be used as a means to collect spring water.

A heating medium such as water vapor, hot wind, cold wind or sea water is introduced into the flow control panel to effect heat exchange between such a heating medium and the water while the flow control panel is moored, suspended, or immersed in the water.

Also, the flow control panel of the present invention may be:

1. installed in a heat exchanger to heat up water in outdoor pools or water to be fed to boilers;
2. installed in a nursery to heat circulating sea water at a low temperature particularly during winter;
3. installed in an airplane or train cleaning station to heat circulating water at a low temperature;
4. installed in an activated sludge tank to heat up a treatment liquid particularly during winter;
5. installed in a market garden to control the temperature of air in a hothouse to produce forced grape, melon and other fruits;
6. used as a heat collector to produce purified water for industrial or agricultural use or for drink;
7. used as a radiator/evaporator to melt snow, to cool the surface of a roof or to cool or vaporize the surface of a membrane;
8. used to cool the wall of a constant-temperature storage or refrigerator to cultivate fungi or to preserve various agricultural products;
9. used in a bacterium cultivating facility to control the temperature of a cultivating liquid for cultivating chlorella or other bacteria;
10. used in hydroponic bed to heat/cool a hydroponic water;
11. used as an artificial flower cultivating bed or indoor or outdoor suspended cultivating sheet;
12. used as a water carrier, water transfer sheet, flat pipe, or sludge water filter;
13. embedded in the ground to effect heat exchange, to drain water and to reserve water;
14. used as a heat collector such as laminated heat sheet or block;
15. used as an evaporator/concentrator sheet to produce natural salt or to concentrate waste water;
16. used as a sheet-like waterweed bed or water-soluble substrate; and
17. used as a display sheet to decorate flowing water.

The present invention has been described with respect to its preferred embodiments. It will be understood that various modifications and changes may be made without departing from the spirit and scope of the invention as defined by the appended claims.

What is claimed is:

1. A flow control unit for enabling control of the flow of a flowing medium, said unit comprising:
    a first sheet having a length;
    a plurality of first spacers secured to said first sheet and extending substantially along the length of said first sheet;
    a second sheet having a length; and
    a plurality of second spacers secured to said second sheet and extending substantially along the length of said second sheet;
    said first and second sheets being superimposed with said first and second spacers alternately positioned therebetween to define a plurality of passages through which a flowing fluid medium flows;
    said first and second spacers being normally engaged with said second and first sheets, respectively, to separate said plurality of passages from one another; and
    at least one of said first and second spacers being relatively moved toward and away from an opposed one of said first and second sheets in response to pressure changes within said plurality of passages.

2. The unit of claim 1, wherein said first spacers are arranged on said first sheet at substantially equal intervals, and said second spacers are arranged on said second sheet at substantially equal intervals.

3. The unit of claim 1, wherein said first and second spacers are fluid permeable.

4. The unit of claim 1, wherein said first and second sheets have opposite lateral ends jointed together.

5. The unit of claim 1, wherein said first and second sheets are made of a relatively high density unwoven fabric, and said first and second spacers are made of a relatively low density unwoven fabric.

6. The unit of claim 1, further comprising a substantially flat tube surrounding said first and second sheets.

7. The unit of claim 6, wherein said tube is made of synthetic resin.

8. A flow channeling unit comprising:
    a lower sheet made of fabric, said lower sheet having an upper face and a lower face;
    a plurality of elongated lower spacers attached to said upper face of said lower sheet;
    an upper sheet made of fabric, said upper sheet having an upper face and a lower face;
    a plurality of elongated upper spacers attached to said lower face of said upper sheet;
    said upper sheet being placed on said lower sheet with said upper spacers alternately positioned between adjacent lower spacers to define therebetween a plurality of passages through which a flowing fluid medium flows;
    said upper and lower spacers being normally engaged with said lower and upper sheets, respectively; and
    at least part of said plurality of upper spacers being dynamically moved toward and away from said lower sheet in response to pressure changes within said plurality of passages.

9. The unit of claim 8, wherein said upper and lower sheets are made of a relatively high density unwoven fabric, and said upper and lower spacers are made of a relatively low density unwoven fabric.

10. A device for enabling a flowing fluid medium to flow along a plurality of defined flowpaths, said device comprising:
    at least one pair of upper and lower planar surface elements arranged one above the other; and
    a plurality of elongate upper and lower partitions alternately disposed between and secured to said at least one pair of upper and lower planar surface elements so as to define a plurality of flow paths extending lengthwise between said at least one pair of upper and lower planar surface elements, and through which a flowing fluid medium is flowable, each of said flow paths having a cross sectional area;

said upper and lower partitions being normally engaged with said at least one pair of said upper and lower planar surface elements; and at least part of said plurality of upper partitions being dynamically movable toward and away from said lower planar surface element when pressure of the flowing fluid medium changes so as to change the cross sectional area of at least part of said plurality of flow paths.

11. The device of claim 10, wherein said upper and lower partitions are disposed substantially in parallel and spaced regularly from each other.

12. The device of claim 10, wherein said at least one pair of upper and lower planar surface elements are made of a relatively high density unwoven fabric, and said upper and lower partitions are made of a relatively low density unwoven fabric.

13. The unit of claim 10, wherein said first and second partitions are fluid permeable.

14. The unit of claim 10, wherein said upper and lower partitions are normally engaged with the upper and lower planar surface elements, respectively, of said at least one pair of said upper and lower planar surface elements.

* * * * *